US012800824B2

(12) United States Patent
Wasserman

(10) Patent No.: US 12,800,824 B2
(45) Date of Patent: Nov. 17, 2026

(54) ILLUMINATED DEVICES HAVING EDGELIT SUBSTRATES WITH TRANSLUCENT U-CHANNEL

(71) Applicant: KPI ENTERTAINMENT, INC., Oak Park, CA (US)

(72) Inventor: Adam Wasserman, Oak Park, CA (US)

(73) Assignee: KPI Entertainment, Inc., Oak Park, CA (US)

( * ) Notice: Subject to any disclaimer, the term of this patent is extended or adjusted under 35 U.S.C. 154(b) by 0 days.

(21) Appl. No.: 19/095,958

(22) Filed: Mar. 31, 2025

(65) Prior Publication Data

US 2025/0306263 A1 Oct. 2, 2025

Related U.S. Application Data

(60) Provisional application No. 63/572,834, filed on Apr. 1, 2024.

(51) Int. Cl.
*F21V 8/00* (2006.01)

(52) U.S. Cl.
CPC ......... *G02B 6/0068* (2013.01); *G02B 6/0021* (2013.01)

(58) Field of Classification Search
CPC .... G02B 6/0021; G02B 6/0073; G02B 6/002; G02B 6/0071; G02B 6/0013; G02B 6/0011; G02B 6/0068
See application file for complete search history.

(56) References Cited

U.S. PATENT DOCUMENTS

| | | | | | |
|---|---|---|---|---|---|
| 5,027,258 | A * | 6/1991 | Schoniger | G02B 6/0023 | 362/800 |
| 5,786,665 | A * | 7/1998 | Ohtsuki | G02B 6/0021 | 362/601 |
| 6,464,372 | B1 * | 10/2002 | Dudek | G02B 6/0021 | 362/265 |
| 7,458,711 | B2 * | 12/2008 | Cheng | G02B 6/0021 | 362/612 |
| 7,738,053 | B2 * | 6/2010 | Kubota | G02B 6/0021 | 362/628 |
| 7,766,536 | B2 * | 8/2010 | Peifer | G02B 6/0021 | 362/613 |
| 8,100,574 | B2 * | 1/2012 | Wang | G02B 6/0073 | 362/613 |
| 8,480,284 | B2 * | 7/2013 | Lin | G02B 6/0021 | 362/621 |
| 9,128,222 | B1 * | 9/2015 | Linblad | G02B 6/0021 | |
| 10,422,939 | B2 * | 9/2019 | Tarsa | G02B 6/0021 | |
| 10,591,662 | B2 * | 3/2020 | Miyashita | G02B 6/0073 | |
| 2004/0004827 | A1 * | 1/2004 | Guest | G02B 6/0091 | 362/249.06 |
| 2007/0127261 | A1 * | 6/2007 | An | G02B 6/0016 | 362/608 |

* cited by examiner

*Primary Examiner* — Ismael Negron
(74) *Attorney, Agent, or Firm* — Ferguson Case Orr Paterson LLP

(57) ABSTRACT

An illuminated device that includes a substrate with a light strip configured to be arranged around the edge of the substrate. Lights on the light strip are pointed inward towards the inside of the substrate. The light strip may be secured along the edge of the substrate using countersunk edging, grooves, or channels, or secured along the edge of the substrate using u-channel connectors.

6 Claims, 2 Drawing Sheets

ILLUMINATED DEVICES HAVING EDGELIT SUBSTRATES WITH TRANSLUCENT U-CHANNEL

REFERENCE TO RELATED APPLICATION

The present application claims priority to U.S. Provisional Patent Application No. 63/572,834 to Wasserman, entitled "Devices, Methods, and Systems for Illuminated Substrates," filed on Apr. 1, 2024, the entirety of which is fully incorporated by reference herein.

BACKGROUND OF THE DISCLOSURE

Field of the Disclosure

The present disclosure relates to devices, methods, and systems for uniformly illuminating substrates effectively, efficiently, and aesthetically. More specifically, devices, methods, and systems comprising a flexible light strip arranged along the edge of a substrate utilizing various connection and/or attachment methods.

Description of the Related Art

Presently available solutions for lighting a substrate involve casting light upon the object, rather than illuminating the object itself. For instance, some solutions for lighting a substrate utilize "back lighting," in which a light is emitted behind the object to give the illusion that it is luminous. Other presently available methods for illuminating a substrate use a channel formed in one face of the substrate, thereby defining an inner portion of the substrate for the insertion of lights, such as light emitting diodes ("LEDs"). Still other methods involve forming a groove in one or more of a front wall and a back wall for mounting LEDs to shine light outwards from the device.

The presently available methods for illuminating a substrate do not provide for uniform illumination around the perimeter of the object from all viewing angles. Accordingly, a method for 360-degree illumination of a substrate would be advantageous.

SUMMARY OF THE DISCLOSURE

One embodiment of an illuminated substrate according to the present disclosure includes a substrate having an outside perimeter and a light strip. The light strip can include a lighted side, which has lights and a non-lighted side. The lighted side can be affixed to said substrate along at least a portion of said outside perimeter.

An embodiment of a method for uniformly illuminating substrates according to the present disclosure includes the steps of obtaining a substrate having an outer perimeter, obtaining one or more light strips with a non-lighted side and a lighted side having a plurality of lights, affixing the lighted side along at least a portion of the outside perimeter of the substrate, and activating the one or more light strips.

BRIEF DESCRIPTION OF THE DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein as defined by the claims.

DESCRIPTION OF THE DISCLOSURE

Figure 1A:
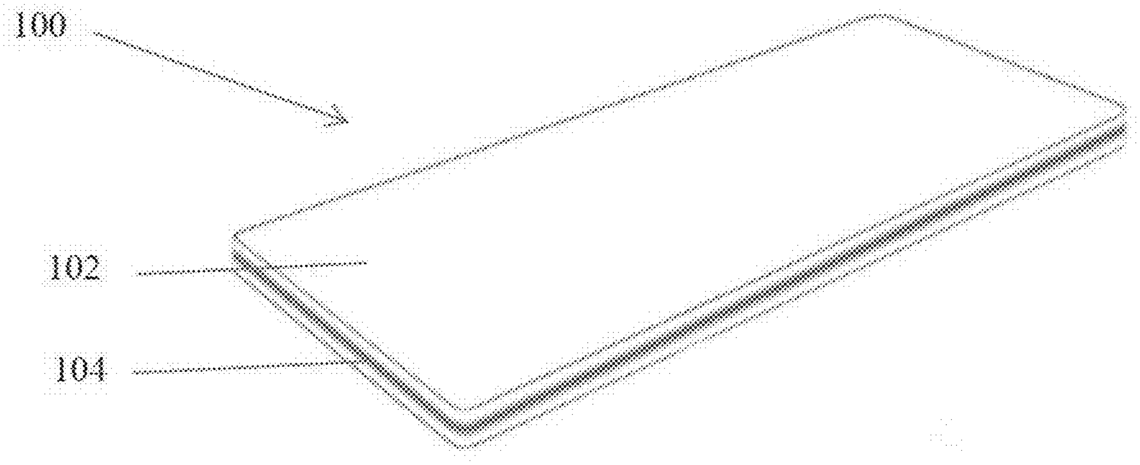
FIGS. 1A-1C show front, top, right side perspective views, respectively, of one embodiment of an illuminated substrate according to the present disclosure.

Throughout this description, the preferred embodiment and examples illustrated should be considered as exemplars, rather than as limitations on the present invention. As used herein, the term "invention," "device," "method," "disclosure," "present invention," "present device," "present method," or "present disclosure" refers to any one of the embodiments of the invention described herein, and any equivalents. Furthermore, reference to various feature(s) of the "invention," "device," "method," "disclosure," "present invention," "present device," "present method," or "present disclosure" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "having," and similar terms, when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing. Like elements among embodiments are referenced herein with the same reference numerals, except where differences are articulated.

Figure 1B:
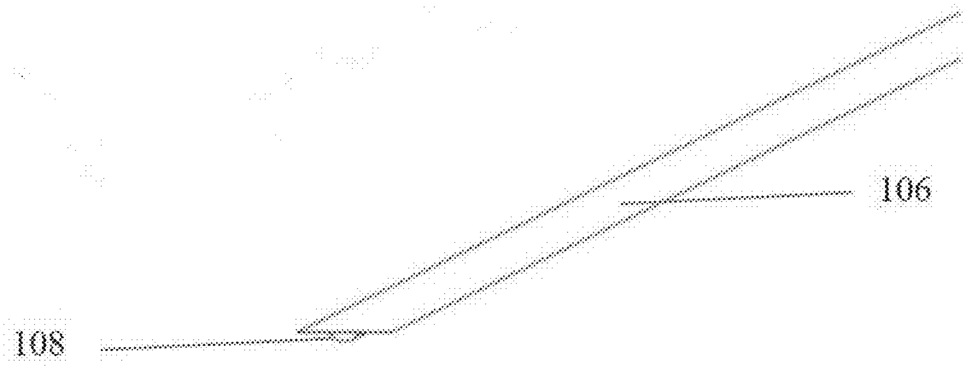
Figure 1C:
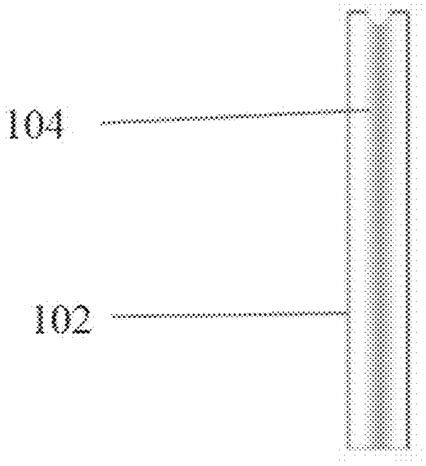

Embodiments of the present disclosure include 360-degree illumination of substrates using inward-facing lights, such as LEDs. FIGS. 1A-1C show an embodiment of an illuminated substrate 100 according to the present disclosure. The illuminated substrate 100 may include a body 102 and at least one countersunk edge 104 in the body 102. The body 102, in some embodiments, includes a transparent material, such as for example, glass, polyethylene, acrylic, polycarbonate, polyvinyl chloride, and other materials known in the art, or combinations of the foregoing. In some embodiments according to the present disclosure, the body 102 comprises countersunk edges 104 around its perimeter. In other embodiments, the body 102 may comprise flat edges, convex edges, or other edge profiles, as one of skill in the art would understand. Similarly, as one of skill in the art would understand, a plurality of edge profiles may be used in a singular embodiment of an illuminated substrate 100 according to the present disclosure, example a square shaped illuminated substrate 100 with top and bottom edges profiled with countersunk edges and side edges profiled with convex edges. Many different combinations are possible.

Although the illuminated substrate 100 shown in FIGS. 1A-1C is generally in the shape of a rectangle, it is understood that many different shapes are possible, such as for example, a triangle, a square, a pentagon, a hexagon, and many other shapes known in the art.

Various methods known in the art may be used to form the countersunk edges 104, such as for example removing material from the body 102. The countersunk edge 104 may also be formed when the body 102 is formed via certain molding techniques. The countersunk edges 104 may be configured to accept a strip 106 including a plurality of lights 108 on one side. In some embodiments, the strip 106 may be flexible such that it may be wrapped around the entire perimeter of the body 102. In other embodiments, the strip 106 may be wrapped around a portion of the perimeter of the body 102. The strip 106, in such embodiments, may be made of polymide, polymer, plastic, resin, cloth, or other flexible and malleable materials known in the art, or combinations of the foregoing. In other embodiments, the strip 106 may be made of a rigid material and pre-formed to generally conform to the shape of the body 102. While one strip 106 is shown in FIG. 1, it is understood that more than one strip 106 may be used, such as 2 or more, 3 or more, or 4 or more. In some embodiments according to the present disclosure, the lights 108 are LEDS, though it is understood that other illumination sources are possible. The strip 106 may be permanently or releasably adhered to the body 102. In some embodiments, the strip 106 may be placed within the countersunk edges 104 with the lights 108 facing towards the interior of the body 102. In specific embodiments, the strip 106 may then be adhered in place with, for example, epoxy, resin, glue, rubbers, tape, edge-banding, vinyl, plastic u-channels, and other adhesives known in the art, or combinations of the foregoing. In specific embodiments, the strip 106 is adhered to the body 102 using the same material as the body 102, thereby forming one contiguous object. In some embodiments according to the present disclosure, the strip 106 is not adhered, but simply placed within the countersunk edges 104 with the lights 108 facing the body 102. In more specific embodiments, the countersunk edges 104 are precisely manufactured to approximately match the dimensions of the strip 106, thereby enabling friction to hold them in place when installed. Because the countersunk edges 104 may be configured to accept the strip 106, when the strip 106 is adhered to the body 102, the edge of the body 102 may be flush or substantially flush with the adhered strip 106.

Figure 2:
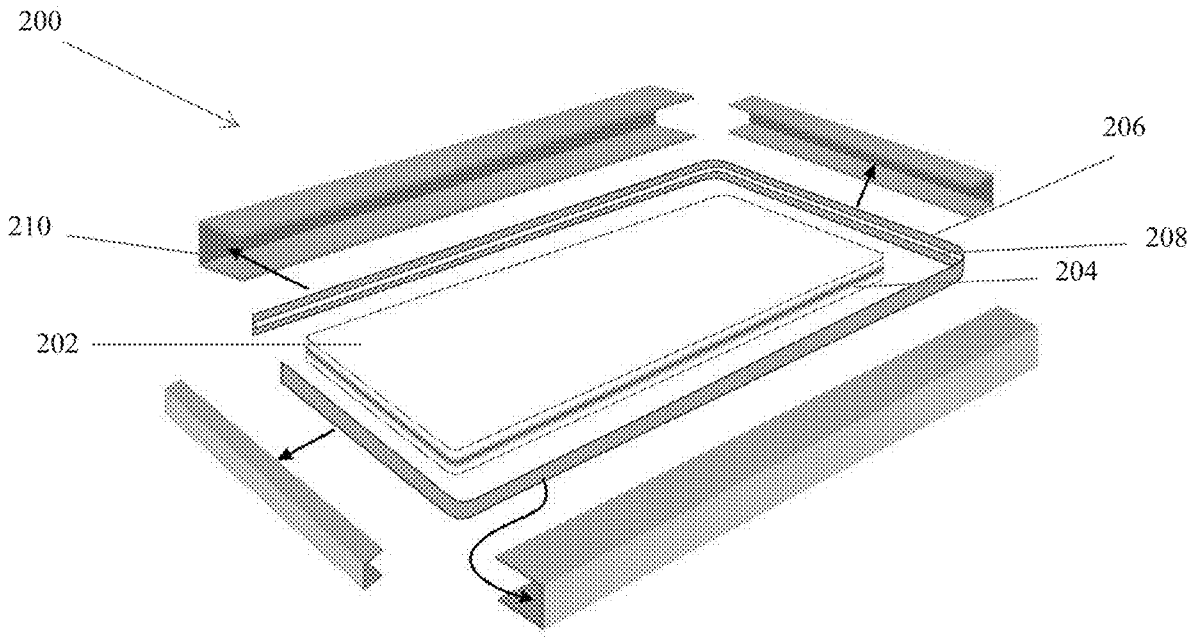
FIG. 2 shows an exploded view of another embodiment of an illuminated substrate according to the present disclosure.

FIG. 2 shows another illuminated substrate 200 according to the present disclosure. The illuminated substrate 200 may, in some embodiments, include a body 202 (which may be the same as or similar to the body 102), a countersunk edge 204 (which may be the same as or similar to the one or more countersunk edge 104) in the body 202, a strip 206 (which may be the same as or similar to the strip 106) that includes lights 208 (which may be the same as or similar to the lights 108), and a plurality of u-channels 210.

The u-channels 210 may be made of translucent or partially translucent materials, similar or identical to the materials discussed hereinabove with respect to the body 102. Some embodiments of u-channels 210 according to the present disclosure are made of opaque materials-rather than translucent or partially translucent materials-such as for example metals. In some embodiments, the u-channels 210 are formed to approximately match the dimensions of the body 202 such that the strip 206 may be affixed to the body 202 via the u-channels 210, with the lights 208 facing the body 202. In some embodiments, like the strips 106, the strips 206 may be adhered to the body 202 via the adhesives discussed above or via friction with the countersunk edges 204. In certain embodiments, the body 202 contains flat edges, convex edges, or other edge profiles known in the art and/or combinations of the foregoing. In some embodiments, the strip 206 may be adhered to the u-channels 210, which in turn may be adhered or otherwise affixed to the body 202 such that the lights 208 contact the body 202. In specific embodiments, the u-cannels 210 are configured to be attached to the body 202 without adhesives, e.g., via friction with the body 202 or via fasteners, such as for example snaps, screws, bolts, and others known in the art.

Figure 3:
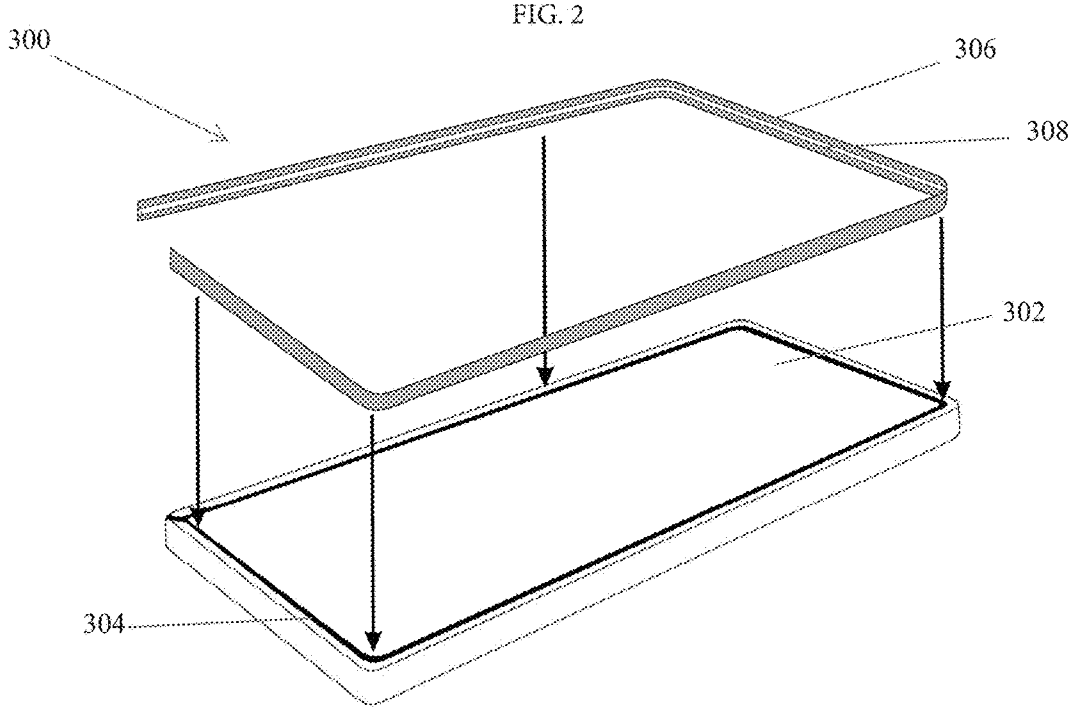
FIG. 3 shows an exploded view of yet another embodiment of an illuminated substrate according to the present disclosure.

FIG. 3 shows another embodiment of an illuminated substrate 300 according to the present disclosure. The illuminated substrate 300 may, in some embodiments, comprise a body 302 (which may be the same as or similar to the body 102, 202), a groove 304 in the body 302, and a strip 306 (which may be the same as or similar to the strip 106,206) that may include lights 308 (which may be the same as or similar to the lights 108, 208).

In some embodiments of the present disclosure, the groove 304 is formed within the body 302 by removal of material via, for example, a router, a CNC machine, a mill, a chisel, or other methods known in the art, or combinations of the foregoing. In other embodiments, the groove 304 is molded with the body 302 such that material need not be removed. In yet other embodiments according to the present disclosure, additive manufacturing methods may be used, as one of skill in the art would understand. Regardless of the method of creating the groove 304, the strip 306 may be inserted in the groove 304 with the lights 308 facing towards the center of the body 302, as shown in FIG. 3. In some embodiments, the groove 304 may then be filled with a sealing material, for example, epoxy, resin, silicone adhesive, or other substances known in the art to embed the strip 306 in the body 302. Then, in some embodiments, excess filling material may be trimmed away, sanded, planed, or other methods known in the art, to create a flat top surface of the body 302.

Because the strip 106, 206, 306 surrounds the entirety of the body 102, 202, 302 and because the lights 108, 208, 308 contact the body 102, 202, 302, when the plurality of the lights 108, 208, 308 are active, i.e. when they are powered and shining light, the body 102,202,302 is uniformly and aesthetically illuminated. Additionally, because the body 102, 202, 302 is surrounded by the strip 106,206,306 by 360 degrees, the body 102, 202, 302 may be uniformly bright and a consistent color throughout. As one of skill in the art would understand, the lights 108, 208, 308 may provide light of varying wavelength and/or intensity such that the body 102, 202, 302 is illuminated uniformly in brightness—but not color—or uniformly in color—but not in brightness. Because the countersunk edges 104, 204 and the groove 304 are configured to accept the strip 106,206, 306, manufacturing is simplified. Further, the uniform distribution of the lights 108, 208, 308 around the body 102, 202, 302 may provide consistent illumination of the illuminated substrate 100,200,300 from all viewing angles.

It is understood that embodiments presented herein are meant to be exemplary. Embodiments of the present disclosure can comprise any combination of compatible features shown in the various figures, and these embodiments should not be limited to those expressly illustrated and discussed. For instance and not by way of limitation, the appended claims could be modified to be multiple dependent claims so as to combine any combinable combination of elements within a claim set, or from differing claim sets.

Although the present disclosure has been described in detail with reference to certain preferred configurations thereof, other versions are possible. Therefore, the spirit and scope of the disclosure should not be limited to the versions described above.

Additionally, it is understood that the components and concepts in the present disclosure can be applied to substrates not specifically mentioned herein. For instance, these components and concepts can be applied to signs, products, displays, architectural features, and other applications known in the art.

The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

I claim:

1. An illuminated device comprising:

a substrate having an outside perimeter;

a light strip having a lighted side with a plurality of lights, and a non-lighted side;

at least one translucent u-channel configured to attach to said outside perimeter of said substrate;

wherein said non-lighted side of said light strip is affixed to said at least one translucent u-channel; and wherein, when said at least one translucent u-channel is attached to said outside perimeter of said substrate, said lighted side is positioned against said substrate such that said plurality of lights are oriented inward toward an interior of said substrate.

2. The illuminated device of claim 1, wherein said outside perimeter of said substrate further comprises a countersunk edge.

3. The illuminated device of claim 1, wherein said light strip is flexible.

4. The illuminated device of claim 1, wherein said lights are evenly spaced along said lighted side.

5. A method for forming an illuminated device comprising:

obtaining a substrate having an outside perimeter;

obtaining a light strip comprising a non-lighted side and a lighted side having a plurality of lights;

affixing said non-lighted side of said light strip to at least one translucent u-channel;

attaching said at least one translucent u-channel to said outside perimeter of said substrate such that said lighted side is positioned against said substrate and said plurality of lights are oriented inward toward an interior of said substrate; and activating said light strip.

6. The method of claim 5, wherein the step of obtaining a substrate having an outer perimeter is followed by the step of:

forming a countersunk edge in said substrate.

* * * * *